UNITED STATES PATENT OFFICE.

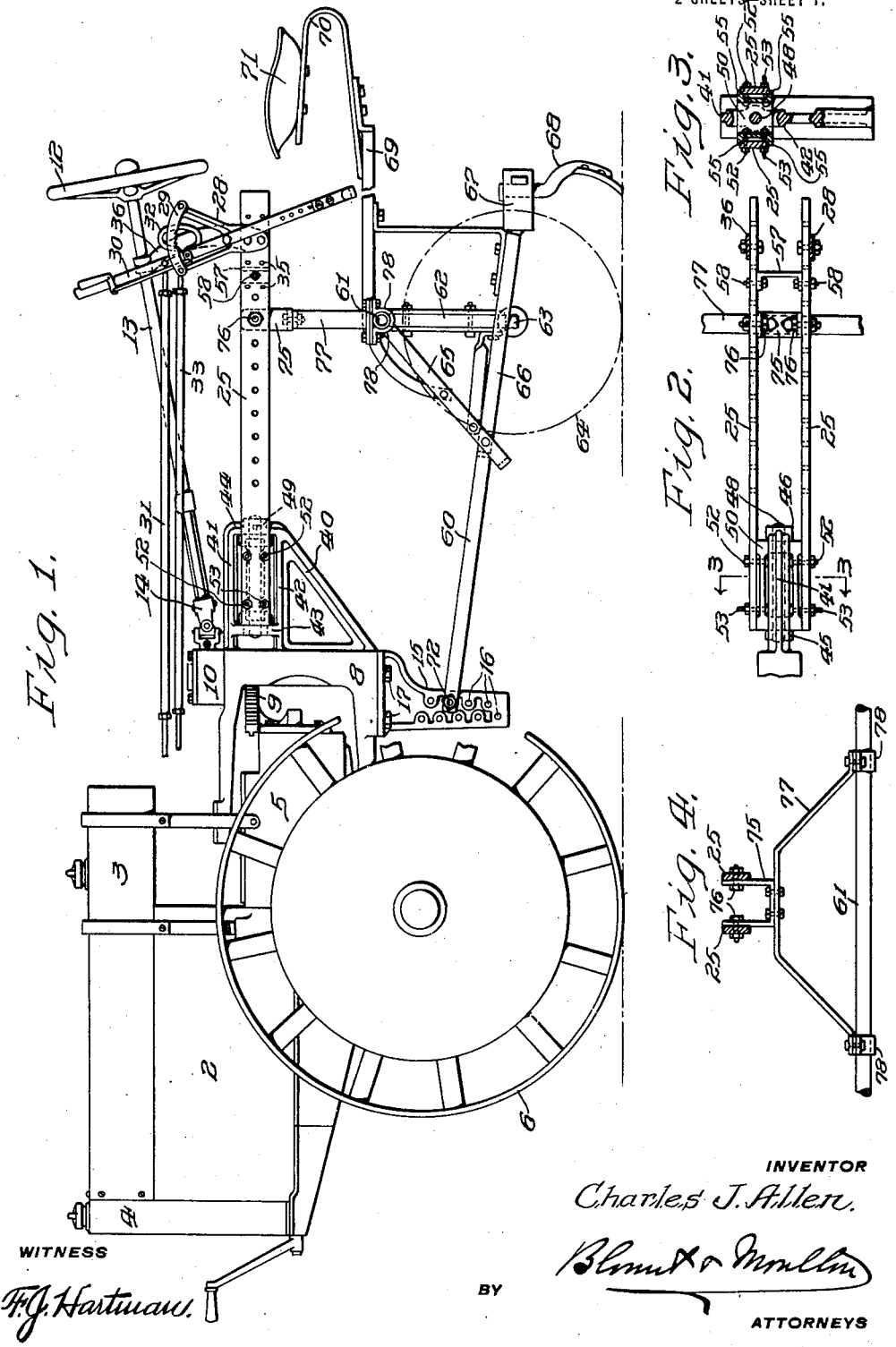

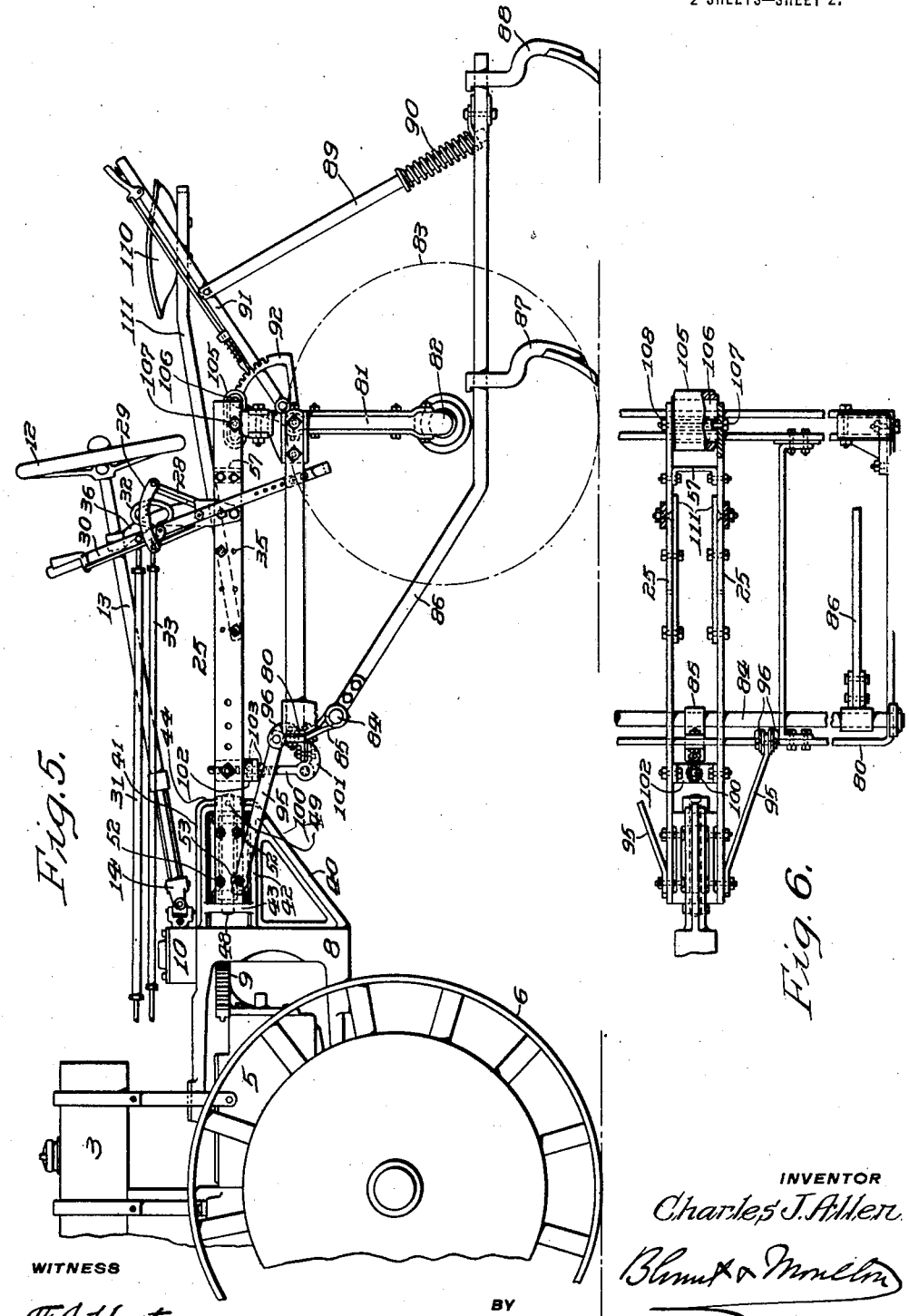

CHARLES J. ALLEN, OF MOORESTOWN, NEW JERSEY, ASSIGNOR TO S. L. ALLEN & CO., INC., A CORPORATION OF PENNSYLVANIA.

TRACTOR.

1,342,523.   Specification of Letters Patent.   Patented June 8, 1920.

Application filed November 7, 1919. Serial No. 336,383.

*To all whom it may concern:*

Be it known that I, CHARLES J. ALLEN, a citizen of the United States, and a resident of Moorestown, county of Burlington, State of New Jersey, have invented certain new and useful Improvements in Tractors, of which the following is a specification, reference being had to the accompanying drawings.

The present invention relates more particularly to tractors adapted for agricultural use in which the power unit is supported by a pair of driving and steering wheels, the tractor being intended for interchangeable connection with some form of trailing implement or vehicle which affords support for the rear end of the tractor and prevents the same from tilting forward or backward on its single pair of wheels. In order that the most satisfactory results may be accomplished in the operation of the tractor, particularly in agricultural work, it is desirable that the connection between the tractor and the trailed implement afford a certain amount of flexibility to thereby permit relative movement, within limits, between the power unit and wheels of the tractor and the implement, in traveling over rough ground and under other conditions when required.

A principal object of the present invention is to provide in a tractor means whereby this required flexibility may be permitted without impairing the security of the connection between the tractor and the trailed implement. Further objects of my invention are to provide in a tractor means adapted to permit relative movement between the power unit and wheels of the tractor, and the part thereof to which the trailed implement may be connected; to provide means in a tractor adapted to permit relative motion on a substantially horizontal axis between the power unit and wheels of the tractor and the part of the tractor to which a trailing implement may be rigidly connected so that, in the operation of the tractor, relative movement between the power unit and wheels of the tractor and the trailing implement may occur in vertical planes so that the implement may be free to roll or oscillate with respect to the power unit and wheels, and vice versa.

Still further objects of my invention include in a tractor means adapted to allow relative movement on a substantially horizontal axis between the rearwardly extending beam of the tractor and the power mechanism and wheels thereof, so that a rigid and simple connection may be employed when desired to secure a trailing implement in operative relation with the beam, thus enabling the utilization of connecting means of the simplest form without impairing the requisite flexibility between the trailing implement and the power unit and wheels of the tractor when in operation.

Additionally, it is an object of my invention to embody in a tractor of the two wheel type having a rearwardly extending member for attachment to a trailing implement, which serves to maintain the power unit of the tractor in substantially horizontal position through the support afforded by the implement, simple and efficient means entirely self contained and forming an integral part of the tractor for permitting relative motion between the beam and the adjacent parts of the tractor, which means may be made sufficiently sturdy in construction for the purposes intended without undue weight and which, under certain conditions, may be utilized as a medium for taking the draft of the trailing implement, an arrangement which is of material advantage when it is desired to utilize the tractor with certain forms of high frame agricultural implements.

My invention further includes all of the other objects and novel features of construction and arrangement hereinafter more definitely specified and described.

In the accompanying drawings, I have illustrated a preferred form of my invention as embodied in a two wheel tractor and in connection with two different types of trailing implements. It will be understood, however, that the particular form and arrangement of the power mechanism, wheels, steering gear, controls and other parts of the tractor form no part of the present invention, and as the same may therefore be of any desired type or construction, I have only illustrated them in a somewhat conventional manner, merely showing in detail such parts as may be necessary to a clear understanding of my invention. Similarly, as any desired type or form of trailing implement may be employed with the tractor, the same have been shown in the drawings in a conventional manner only, and it will therefore be understood that those portions of the tractor and implements which I have shown and which are not immediately concerned with my invention, as hereinafter described, may be of any form and arrangement suitable for their respective functions.

Referring now more particularly to the drawings, Figure 1 is a side elevation of a two wheel tractor embodying my invention and connected to a conventional form of cultivator, certain parts being broken away for the sake of clearness; Fig. 2 is a top plan view of a portion of the tractor, the control rods, steering post and allied mechanism being omitted; Fig. 3 is a transverse vertical section taken on the line 3—3 in Fig. 2, and Fig. 4 is a fragmentary end elevation of a portion of the implement and of the connecting means. In Fig. 5 I have illustrated in side elevation, a tractor similar to that shown in Fig. 1 connected to an implement, for example, a cultivator, having a high frame and conventionally represented, and Fig. 6 is a fragmentary top plan view of a portion of the tractor and of the implement connected as shown in Fig. 5. Like numerals are employed to designate similar parts in the several figures.

Referring now more particularly to Figs. 1, 2, 3 and 4, the form of tractor therein shown comprises a suitable power mechanism located beneath a hood 2, above which may be conveniently supported a fuel tank 3 and in front of which may be located a radiator 4. In the rear of the power mechanism and rigidly secured thereto, is a transmission case or housing 5 containing a suitable transmission mechanism, these parts being operatively connected with, and supported by, the driving or traction wheels 6, one of which is located on each side of the center line of the machine. It will be understood that suitable gearing or other means are provided by which the power generated by the power mechanism may be communicated to the wheels through a suitable clutch and the transmission mechanism, to drive them forward or backward as may be desired.

A yoke 8, preferably pivotally supported at points adjacent the top and bottom of the transmission housing, extends rearwardly therefrom and is arranged for movement in a horizontal plane relative thereto, suitable means being provided for imparting such movement to the yoke during the operation of the tractor. Said means, which may be of any desired form or construction, may conveniently comprise a horizontally positioned rack 9 secured to and extending rearwardly from the transmission housing, adapted for engagement by a pinion (not shown) supported on a vertically extending shaft movable with the yoke and extending upwardly into a housing 10 carried thereby. Within this housing may be conveniently positioned suitable mechanism for imparting rotation to the shaft, as, for example, a horizontally positioned worm engaging the worm gear on the shaft and arranged for rotation from the steering wheel 12 operatively connected, through the steering post 13 and universal joint 14, with the worm. However, the details of the mechanism for steering the tractor by causing relative movement between the yoke, and the power mechanism and driving wheels form no part of my invention, and may therefore be of any construction suitable for accomplishing the results desired.

Depending downwardly from the lower face of the yoke may be arranged a preferably removable, draft plate 15 provided with a plurality of holes 16 positioned one above the other for convenient attachment of the tongue, draw bar or corresponding parts of a trailing implement. The draft plate, which is of sufficient strength to take the draft of the implement when employed for that purpose, is preferably formed separately from the yoke and arranged to be secured thereto by upwardly extending bolts 17 passing through a transversely and horizontally positioned flange at the upper extremity of the plate, thus permitting ready removal or attachment of the plate to the yoke, the plate being preferably positioned midway between the side faces thereof, so that when the yoke is at the center of the rack, the draft plate will lie in the plane of the center line of the tractor.

The tractor is provided with a rearwardly extending member which may be termed the "beam", adapted for attachment to, and support by, the trailing implement, and serving, among other purposes, when so connected, to maintain the power mechanism of the tractor in a substantially horizontal position. The beam may be conveniently composed of a pair of laterally spaced members 25, each preferably consisting of a flat, vertically positioned and longitudinally extending plate of steel or other suitable material. The inner ends of the members, that is, the ends nearest the yoke 8, are secured in position in a manner to be hereinafter described, and near their outer ends may be conveniently positioned a bracket 28 carrying a quadrant 29 coöperative with a clutch lever 30, which, through a suitable connecting member 31, may be arranged to control the clutch (not shown) with which the tractor is supplied. Other controlling devices, as, for example, the handle 32 on the end of a control member 33, may also be supported by the bracket 28, or otherwise, near the ends of the members 25 and arranged to operate any desired parts of the power control mechanism, as, for instance, the gear shifting means. In order that the various control members and steering wheel may be brought within convenient reach of the tractor operator, the outer extremities of the members 25 are preferably provided with a plurality of suitably disposed bolt holes 35 for the reception of the bolts which hold the bracket 28 or other parts in position, so that the same may be adjusted as desired with respect to the beam, as may also be a standard 36 secured to the beam and serving to conveniently support the outer end of the steering post 13, suitable provision, of course, being made for extending or shortening the control members to correspond with the different positions to which the bracket and standard may be adjusted, as will be well understood by those familiar with the art.

For supporting the inner ends of the members 25, which together form the rearwardly extending beam of the tractor, in such manner that the beam as a whole will be capable of rotation or oscillation about a horizontal axis with respect to the yoke and power mechanism of the tractor, suitable means are provided which, in the form of the invention illustrated, comprise a bracket 40 extending rearwardly from, and preferably formed integrally with, the yoke 8. The upper part of the bracket preferably comprises horizontally extending members 41, 42, arranged in vertically spaced, parallel relation and connected by the vertically positioned integral webs 43, 44, the former positioned adjacent the yoke and the latter at the rear end of the bracket. Each of these webs is preferably enlarged substantially intermediate of its length to form the cylindrical, centrally bored bosses 45 and 46, thus providing a pair of alined apertures in the bracket adapted for the reception of a longitudinally extending pintle 48 held in fixed relation with the bracket by any convenient means, for example, a transversely extending pin 49 passing through one of the bosses and the pintle.

Positioned within the space defined by the members 41 and 42 and webs 43 and 44 and rotatably supported upon the pintle 48, which passes through a longitudinally extending bore therein, is a block 50, the ends of which terminate adjacent the webs and through contact therewith prevent longitudinal movement of the block. The lateral sides or faces of the block are adapted for attachment of the forward ends of the members 25, which may be rigidly secured to the block by any convenient means, such as the bolts 52, 53, extending outwardly and transversely with respect to the block through members 25, and of sufficient length to receive suitable nuts on their outer extremities. While in certain constructions it may be desired to form the block entirely solid, it is ordinarily, and as shown in the drawings, formed hollow and also cut away somewhat at the central portion of each side, thus reducing its weight and also facilitating the introduction of the bolts 52 and 53 into their respective bolt holes. The block may also be provided along its outer longitudinally extending edges with small outwardly directed flanges 55 vertically spaced so as to provide a channel on each side of the block for the reception of the adjacent member 25, thus assisting in maintaining a rigid relation between the members and the block when assembled. For keeping the members 25 at all times in substantially parallel relation, a transversely positioned stay 57 may be located between the members adjacent their outer extremities and either fixedly or removably secured in position by bolts or rivets 58.

With the various parts of the tractor constructed and assembled preferably substantially as hereinbefore described, it will be evident that the beam of the tractor is capable of rotation or oscillation, about the pintle 50, and with respect to the yoke and power unit of the tractor, so that when an implement is rigidly connected to the beam, a corresponding movement may take place between the implement and the said portions of the tractor.

In Fig. 1 I have shown the tractor in operative connection with a conventional form of cultivator having a tongue or draw bar 60 at a relatively short distance above the ground. Such a cultivator ordinarily comprises a transversely extending bar 61 maintained on vertically extending supports 62, at the lower extremities of which are carried axles 63 about which wheels 64 are arranged to rotate. Extending forwardly and downwardly from bar 61 are a plurality of braces 65 connected with side frame members 66, toward the rear of which are positioned gang bars 67 carrying the cultivator blades 68. A seat support bar 69 riding on the transverse bar 61 and secured at its forward end at some convenient point, for example, to one or more of the supports 65, projects rearwardly for any desired distance, a spring 70 secured thereto serving to support the operator's seat 71. The draft bar or tongue 60, hitherto referred to, extends forwardly from some convenient part of the implement, and is adapted for operative connection with the draft plate 15 by means of a bolt 72 or other suitable means in such manner that the draft of the implement will be taken by the plate when the tractor is in operation.

For effecting a connection between the beam of the tractor and the implement, any suitable means may be employed, preferably, and as shown in the drawings, a U-shaped member 75 removably secured between members 25 by bolts 76, and extending for a short distance below the beam. This member is bolted or otherwise secured to an upwardly extending support or strap 77, the lower ends of which are preferably carried by clips 78 surrounding bar 61 and rotatable with respect thereto, thus permitting the strap to be brought to a position to facilitate its attachment to the member 75, without regard to the point of attachment of the draw bar to draft plate 15, which point may be varied as desired to thereby regulate the position of blades 68 with respect to the ground surface.

It will be evident that when the tractor and implement are connected as heretofore described, the implement and beam are free to oscillate as a unit with respect to the yoke, power unit and wheels of the tractor and vice versa, the connection of the beam with the implement serving mainly to maintain the power unit of the tractor in substantially horizontal position, and the draft of the implement being taken almost entirely by the draft plate 15.

Certain forms of agricultural implements, however, are not well adapted for connection with a tractor in the manner hereinbefore described, as the draw bar or tongue of these implements is not properly positioned for convenient attachment to a draft plate or corresponding member of the tractor occupying a relatively low position with respect to the power mechanism thereof. Implements of this class are ordinarily provided with a frame raised for a relatively great distance from the ground, thus correspondingly elevating the tongue, draw bar or other means used for attaching the implement to the tractive means employed, and it is therefore desirable to effect the draft connection between the implement and the tractor at a point more elevated with respect thereto than is occupied by the ordinary draft plate.

In Figs. 5 and 6 I have shown somewhat conventionally an implement, in this case a cultivator, of the general character of those to which reference has just been made, connected to a tractor embodying my invention. It will be understood that the tractor illustrated in said figures is substantially similar to the tractor illustrated in Figs. 1 to 4 inclusive and hereinbefore described, the draft plate 15, however, being removed so as to increase the clearance of the tractor and prevent contact of the plate with the growing plants which are being cultivated.

The cultivator shown in Figs. 5 and 6 comprises a rectangular frame 80 suitably stayed, from which depend supports 81 carrying axles 82 on which the wheels 83 are arranged to revolve. Adjacent the forward end of the frame and extending transversely with respect thereto, is a bar 84 suspended in clips 85 secured to the frame, and depending downwardly and rearwardly therefrom are gang bars 86, arranged for swinging movement about the bar 84, and supporting cultivator blades 87 and 88. Positioned at the outer end of each gang bar is a link 89 actuated, against a spring 90, by a hand lever 91, coöperative with a notched quadrant 92 secured to the frame, so that by moving the lever the position of the blades 88, and to a lesser extent of the blades 87, can be vertically adjusted.

For effecting the draft connection between the implement and the tractor, a pair of links 95 are provided, the forward ends of which are conveniently rotatably secured to the block 50 by the bolts 53 and the rear ends of which are pivotally connected with the frame 80 of the implement in any suitable manner, as, for example, by means of two pairs of spaced ears 96 vertically positioned on the frame, between each pair of which the end of one of the links may be secured by a transversely extending bolt 97.

In order that both blades 87 and 88 may be maintained in proper adjustment with respect to the ground surface, means are preferably provided for regulating the height of the forward end of the frame 80 since, as the effect of adjustment by lever 91 is more pronounced on blades 88 than on blades 87, it is frequently desirable to raise or lower the forward end of the frame to correspondingly raise or lower the blades 87 to compensate for excessive movement of the blades 88. For this purpose I provide a vertically positioned screw 100, having its lower end hinged to an ear 101 secured to the frame, and its upper end extending through an aperture in the bottom of a U-shaped member 102 disposed between the beam members 25 and secured thereto, nuts 103 positioned on the screw above and below the U-shaped member serving to position the screw at any desired point with respect thereto. Hence, by adjusting nuts 103 the forward end of the frame 80 may be raised or lowered with respect to the ground level and the tractor beam, thereby effecting a corresponding movement of the blades 87, and to a lesser extent, of the more remotely removed blades 88.

Since the adjustment just referred to is effective to slightly alter the position of the links 95, and in turn causes some slight movement of the frame 80 in a generally longitudinal direction with respect to the beam, it is necessary that the connection between the outer end of the beam and the implement, and to which reference will now be made, be adapted to take care of this movement as well as to effect the attachment of the outer end of the beam to the implement. For this purpose I prefer to provide a horizontally and transversely slotted member 105 of sufficient width to fit freely between members 25 and to rigidly secure the same to the frame of the implement in any suitable manner. Through the horizontally disposed, transversely extending slot 106 of this member, passes a suitable bolt 107 which also extends through the members 25 and is secured in place by a nut 108, so that while the beam, when adjusted, is prevented from vertical movement with respect to the frame of the implement it will, nevertheless, be capable of such longitudinal movement with respect thereto as is required while the vertical adjustment of the frame is being made.

It will be observed that the operator's seat 110 is shown in Fig. 5 as supported upon, and carried by, a pair of rearwardly extending arms 111 bolted to the side members of the beam, while in Fig. 1 the seat is shown as carried by the implement. The position and arrangement of the seat, however, are merely matters of choice, and form no part of the present invention.

It will be evident that when the tractor is connected with an implement of the general type conventionally illustrated in Figs. 5 and 6, the beam of the tractor is maintained in fixed operative relation with the implement, while the frame of the latter is capable of adjustment in a vertical direction with respect thereto when desired for the purpose of regulating the height of the implement teeth; that the draft of the implement is taken by the block 50 in conjunction with the web 44 of the bracket 40 and that at all times relative movement about a longitudinal axis may take place between the beam of the tractor and the implement moving as a unit on one hand, and the power mechanism, yoke and wheels of the tractor on the other, thus affording the flexibility required when the tractor and implement are being operated on uneven ground.

It will be understood that while I have hereinbefore illustrated and described a single form of tractor embodying my invention and have shown the same connected to two conventional forms of agricultural implements as typifying different classes thereof, I do not thereby desire or intend to limit or restrict the employment of my invention to any particular form or type of tractor, as the same may be embodied in tractors of varying types and utilized with different forms of agricultural implements, vehicles and the like as desired. Furthermore, suitable changes and modifications may be made in the details of construction and arrangement of the several parts as desired, or as may be found necessary under the varying conditions encountered in practice without departing from the spirit and scope of my invention as defined in the appended claims.

Having thus described my invention, I claim and desire to protect by Letters Patent of the United States:

1. The combination in a tractor, of a power unit, control means for said unit, a yoke member vertically pivoted and horizontally movable with respect thereto, a beam extending rearwardly from said yoke member and operative to support said control means and means operative to connect said beam and said yoke member and permit the oscillation of said beam with respect to said yoke member about the longitudinal axis of said beam.

2. In a tractor, the combination of a power unit, a yoke movable with respect to said unit, a bracket extending rearwardly from said yoke, a block positioned within said bracket and arranged for oscillation about its longitudinal axis and a pair of rearwardly extending members secured to said block and disposed on each side of said bracket, said members forming the beam of the tractor.

3. In a tractor, the combination of a power unit, a yoke movable with respect to said unit, a bracket extending rearwardly from said yoke, a block mounted in said bracket and movable with respect thereto about a horizontal axis and a pair of rearwardly extending laterally spaced members disposed exteriorly to said bracket secured to said block and movable therewith.

4. In a tractor, the combination of a power unit, a yoke horizontally movable with respect thereto, a bracket extending rearwardly from said yoke, a block mounted within said bracket and movable about a longitudinally extending pintle fixed with respect to said bracket and a pair of members secured to the opposite lateral faces of said block, extending rearwardly therefrom and movable therewith.

5. A tractor comprising a power unit, wheels supporting said power unit, a yoke movable with respect to said unit and a beam comprising spaced members extending rearwardly from and embracing a portion of said yoke, supported thereby, and rotatable with respect thereto about its longitudinal axis.

6. A tractor comprising a power unit, a pair of wheels supporting said unit, a yoke horizontally movable with respect to said unit, a bracket extending rearwardly from said yoke, a beam comprising a pair of laterally spaced members disposed on each side of said bracket, operatively supported thereby and movable about a longitudinal axis with respect thereto.

7. A tractor comprising a power mechanism, a yoke horizontally movable with respect to said mechanism, a bracket extending rearwardly from said yoke and having a pair of spaced vertical webs, a block mounted between said webs and movable with respect to said bracket about a horizontal axis, and a pair of members extending rearwardly from said block and operatively secured thereto.

8. A tractor comprising a power mechanism, a yoke horizontally movable with respect to said mechanism, a bracket extending rearwardly therefrom having a pair of vertically extending, longitudinally spaced webs, a pintle mounted in fixed relation with said webs, a block mounted between said webs and rotatable about said pintle and a pair of spaced, oppositely disposed members operatively secured to said block and extending rearwardly therefrom.

9. The combination with a tractor having a power unit, a pair of wheels supporting said unit, a yoke horizontally movable with respect to said unit, a block supported in operative relation with respect to said yoke and movable relatively thereto about a horizontal axis, and a pair of spaced members operatively rigidly secured one on each side of said block and extending rearwardly therefrom forming a beam for the tractor, of a trailing implement, and means for operatively securing said implement to said beam whereby said implement and said beam are adapted to move unitarily with respect to said yoke.

10. The combination with a tractor having a power unit, a yoke movable with respect to said unit and a beam rotatable about a horizontal axis with respect to said yoke and carried thereby, of a trailing implement having a frame, means to operatively connect said beam and said implement whereby said implement is adapted to move unitarily with said beam with respect to said yoke and means for effecting vertical adjustment of the frame of said implement with respect to said beam.

11. The combination with a tractor having a power mechanism, a yoke horizontally movable with respect to said mechanism and a beam supported by said mechanism, rotatable about a horizontal axis with respect thereto and comprising a pair of laterally spaced, rearwardly extending members, of a trailing implement having a frame, means for securing said implement to said beam at a plurality of points and means operative to effect vertical adjustment of said frame with respect to said beam.

12. The combination with a tractor having a power unit, a yoke horizontally movable with respect to said unit, a bracket supported by said yoke, a block positioned within said bracket and rotatable about a horizontal axis with respect thereto, and a beam comprising a pair of spaced members secured one on each side of said block and rearwardly extending therefrom, of a trailing implement having a frame, means for connecting said implement to said block and to said beam, means for effecting vertical adjustment of the frame of said implement with respect to said beam and means for permitting longitudinal movement of said frame with respect to said beam during said vertical adjustment.

In witness whereof, I have hereunto set my hand and seal this 4th day of November, A. D. 1919.

CHARLES J. ALLEN. [L. S.]